{"3,459,774"}

3,459,774
METHOD OF PRODUCING α-TOCOPHERYL ACID SUCCINATE

Tetsuya Nakamura, Saitama, and Shizumasa Kijima, Tokyo, Japan, assignors to Eisai Co., Ltd., Tokyo, Japan
No Drawing. Filed Feb. 6, 1967, Ser. No. 613,994
Int. Cl. C07d 7/22
U.S. Cl. 260—345.5         3 Claims

ABSTRACT OF THE DISCLOSURE

A method of making α-tocopheryl acid succinate in which α-tocopherol is reacted with succinic anhydride in the presence of anhydrous sodium acetate, as a catalyst, and a metal, such as zinc, and an organic acid, such as acetic acid, so that the reaction is carried out under a reductive condition.

---

This invention relates to improvements in a method of producing α-tocopheryl acid succinate. More particularly, the present invention relates to a method of producing α-tocopheryl acid succinate by reacting α-tocopherol with succinic anhydride under a reductive condition by using anhydrous sodium acetate as a catalyst. The term "α-tocopherol" used in the present specification shall include both a d- form and the dl- form.

Since α-tocopherol is a viscous oil and is readily oxidizable in air, it is difficult to handle for pharmaceutical preparation. On the other hand, α-tocopheryl acid succinate, in its free form and in its inorganic salt forms, paricularly its calcium salt form, is a solid vitamin E derivative and it is stable against oxidative decomposition. Thus, it is very advantageous for medical purposes.

Several methods of producing α-tocopheryl acid succinate are already known. They are, for example, a method wherein d-α-tocopherol concentrate in pyridine is reacted with succinic anhydride (J. B. Baxter et al.: Journal of American Chemical Society, vol. 65 pages 918–924, 1943), a method wherein d-α-tocopherol is reacted with Grignard's reagent and the complex compound formed is then treated with succinic anhydride to obtain the object product (L. I. Smith et al.: U.S. Patent 2,407,726, patented on Sept. 17, 1946), a method wherein d-α-tocopherol concentrate is reacted with succinic anhydride in the presence of a great excess of pyridine and is then converted into the potassium salt to isolate the object product (Distillation Products Inc.: British Patent 639,011, published on June 21, 1950) and a method wherein d-α-tocopherol is reacted with succinic anhydride in the presence of a tertiary base in a nonpolar solvent (Vitamins Ltd.: British Patent 866,489, published on Apr. 26, 1961).

However, all of the above-mentioned methods have considerable defects for industrial manufacturing procedures. For example, in each of the methods mentioned above in which a basic catalyst is used, the color of the reaction mixture will be darkened so remarkably during the reaction that a complicated decoloring process will be required and thereby the yield will be considerably reduced. The reaction in which Grignard's reagent is used requires a substantially anhydrous state and is therefore low in its practicability.

In the present invention, α-tocopheryl acid succinate can be obtained, without such defects of the conventional methods as are mentioned above, by esterifying α-tocopherol with succinic anhydride using anhydrous sodium acetate as a catalyst under a reductive condition.

According to the present invention, as the readily oxidizable tocopherol is treated under a reductive condition, the esterification reaction will proceed substantially quantitatively without undesirable side reactions, and there will be substantially no coloring of the reaction mixture during the reaction. Further, in case a naturally obtained tocopherol concentrate which ordinarily contains colored material is used as a raw material, the decoloring will be carried out simultaneously during the esterification reaction. Thus, a product of high purity can be obtained by simple after-treatments. Further, the manufacturing step is so simple as to require no complicated apparatus. As a result, it is possible to reduce the cost of preparing the α-tocopheryl acid succinate.

Metals and organic acids are used to form a reductive condition in the reaction. Particularly a combination of zinc and acetic acid will give a favorable result. Preferably, 1 mol of α-tocopherol is heated to react with 1.2 to 1.4 mols of succinic anhydride, in the presence of anhydrous sodium acetate in a catalytic amount, preferably 2 to 20 wt. percent based on the weight of α-tocopherol, zinc in an amount of 2 to 20 wt. percent based on the weight of α-tocopherol and acetic acid in an amount of 1 to 5 times as much as the weight of α-tocopherol. The reaction temperature is not critical but a temperature of 100 to 140° C. is suitable. A reaction time in the range of 2 to 8 hours is suitable. The end of the reaction can be confirmed by carrying out the Emmerie-Engel reaction. See page 275 of Methods of Vitamin Assay, Interscience Publishers, Inc., New York (1951). The reaction is complete when the reaction mixture does not develop color when tested by the Emmerie-Engel reaction. After the reaction is completed, the reaction mixture is poured into water and is then extracted with an organic solvent such as hexane, ligroin, petroleum benzine or isopropyl ether and the extract is washed with water and is concentrated under a reduced pressure to obtain a light yellow oily substance. The viscous oily substance thus obtained will contain α-tocopheryl acid succinate at a favorable yield close to the theoretical amount.

Examples of the present invention are shown in the following:

Example 1

17.2 g. of dl-α-tocopherol (purity 100%), 6.0 g. of succinic anhydride, 1.0 g. of anhydrous sodium acetate, 1.0 g. of zinc powder and 20 ml. of acetic acid were mixed together. The mixture was heated at 120–130° C. for 4 hours with stirring. Then the reaction mixture was poured into water and extracted with hexane. The hexane extract was washed with water, dried with sodium sulfate and filtered. The filtrate was concentrated under a reduced pressure to obtain 21.0 g. of a light yellow viscous oily substance; purity 99.5% (by spectrophotometric determination).

When it was left at room temperature, the product solidified in 3 to 7 days. It gradually melted at 64 to 67° C.

Example 2

4.6 g. of d-α-tocopherol (purity 94%), 2.0 g. of succinic anhydride, 0.5 g. of anhydrous sodium acetate, 0.5 g. of zinc powder and 10 ml. of acetic acid were mixed together and reacted under the same condition as in Example 1. 5.3 g. of a light yellow viscous oily substance was obtained. When it was refined with an alumina column chromatography, 5.0 g. of a product were obtained. When the product was left at room temperature, it solidified in 1 to 2 days. The obtained ester showed a purity of 99.5% and a melting point of 75 to 76° C.

The embodiments of the invention in which an exclusive property or privilege is claimed are defined as follows:

1. A method of producing α-tocopheryl acid succinate comprising the steps of reacting α-tocopherol with succinic anhydride in the presence of anhydrous sodium acetate, zinc and acetic acid.

2. The method according to claim 1, in which 1 mol of α-tocopherol is reacted with 1.2 to 1.4 mols of succinic anhydride in the presence of 2 to 20 wt. percent sodium acetate and 2 to 20 wt. percent zinc, each based on the weight of α-tocopherol and acetic acid in an amount of 1 to 5 times as large as the weight of α-tocopherol.

3. The methanol according to claim 2, in which the reaction temperature is in the range of 100 to 140° C.

References Cited

UNITED STATES PATENTS 2,358,046   9/1944   Baxter et al. _____ 260—345.5

OTHER REFERENCES

Baxter et al.: Jour. Amer. Chem. Soc., vol. 65, pp. 918–24 (1943).

Joffe et al.: Jour. Amer. Chem. Soc., vol. 65, pp. 925–27 (1943).

HENRY R. JILES, Primary Examiner

JOHN M. FORD, Assistant Examiner